(12) United States Patent
Purcell et al.

(10) Patent No.: US 7,865,698 B1
(45) Date of Patent: Jan. 4, 2011

(54) DECODE MODE FOR AN AUXILIARY PROCESSOR UNIT CONTROLLER IN WHICH AN OPCODE IS PARTIALLY MASKED SUCH THAT A CONFIGURATION REGISTER DEFINES A PLURALITY OF USER DEFINED INSTRUCTIONS

(75) Inventors: Kathryn S. Purcell, Mountain View, CA (US); Ahmad R. Ansari, San Jose, CA (US)

(73) Assignee: Xilinix, Inc., San Jose, CA (US)

( * ) Notice: Subject to any disclaimer, the term of this patent is extended or adjusted under 35 U.S.C. 154(b) by 351 days.

(21) Appl. No.: 12/057,356

(22) Filed: Mar. 27, 2008

(51) Int. Cl.
*G06F 9/30* (2006.01)
(52) U.S. Cl. .......................... 712/208; 712/34
(58) Field of Classification Search ................ None
See application file for complete search history.

(56) References Cited

U.S. PATENT DOCUMENTS

| | | | | |
|---|---|---|---|---|
| 5,388,233 | A * | 2/1995 | Hays et al. | 712/208 |
| 5,446,851 | A * | 8/1995 | Yamaguchi | 712/227 |
| 6,081,884 | A * | 6/2000 | Miller | 712/204 |
| 6,247,113 | B1 * | 6/2001 | Jaggar | 712/200 |
| 6,986,023 | B2 * | 1/2006 | Paver et al. | 712/34 |
| 7,036,112 | B2 * | 4/2006 | Ungar et al. | 717/136 |
| 7,243,212 | B1 | 7/2007 | Purcell et al. | |
| 7,346,759 | B1 | 3/2008 | Ansari et al. | |
| 2002/0133689 | A1 * | 9/2002 | Park et al. | 712/34 |
| 2004/0034851 | A1 * | 2/2004 | Ungar et al. | 717/136 |

OTHER PUBLICATIONS

Xilinx (PowerPC 405 Processor Block Reference Guide—version 2.1); Jul. 20, 2005; pp. 183-218.*
Ansari et al. (Accelerated System Performance with APU-Enhanced Processing); Xcell Journal; First Quarter 2005; 4 pages.*
Xilinx (PowerPC 405 Processor Block Reference Guide—version 2.2); Jun. 5, 2007; 250 pages.*
U.S. Appl. No. 10/912,844, filed Aug. 6, 2004, Ansari, Ahmad R., et al., entitled "Coprocessor Interface Controller", Xilinx, Inc. 2100 Logic Drive, San Jose, California 95124.
U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.

(Continued)

*Primary Examiner*—Eddie P Chan
*Assistant Examiner*—Keith Vicary
(74) *Attorney, Agent, or Firm*—W. Eric Webostad; Kevin T. Cuenot; Thomas George (57) ABSTRACT

A method for decoding, including: obtaining an op-code from a master device; setting a mode to mask a first portion of the bits of the op-code, where the first portion of the bits are for being treated as a wildcard value; and decoding a second portion of the op-code that is not masked to determine whether the op-code is for a slave device. The decoding of the second portion is performed by a controller having a decoder, and the controller bridges the master device for communication with the slave device. The decoding of the first portion of the bits is performed by the slave device. The first portion of the bits identifies an instruction from a group of instructions, and the group of instructions uses a single configuration register of registers of the controller.

20 Claims, 7 Drawing Sheets

OTHER PUBLICATIONS

UG200 (v1.0), "Embedded Processor Block in Virtex-5 FPGAs", Jan. 15, 2008, 323 pages, Xilinx, Inc. 2100 Logic Drive, San Jose, CA 95124.

UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

DECODE MODE FOR AN AUXILIARY PROCESSOR UNIT CONTROLLER IN WHICH AN OPCODE IS PARTIALLY MASKED SUCH THAT A CONFIGURATION REGISTER DEFINES A PLURALITY OF USER DEFINED INSTRUCTIONS

FIELD OF THE INVENTION

The invention relates to integrated circuit devices (ICs). More particularly, the invention relates to a decode mode for an auxiliary processor unit controller for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile may include both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration (programming) sequence.

For all of these PLDs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Microprocessors are being embedded in Application Specific Integrated Circuits ("ASICs"), Application Specific Standard Products ("ASSPs"), and System-On-Chips ("SoCs"). These SOCs may be PLDs, such as FPGAs, that may contain one or more embedded microprocessors. Applications run exclusively on an embedded processor ties up the processor and thus does not have the advantage of off-loading tasks to a coprocessor. Alternatively, a coprocessor unit may be implemented in FPGA programmable resources ("FPGA fabric") and coupled to an embedded microprocessor for off-loading tasks to the coprocessor. The term "coprocessor" as used herein means a coprocessor instantiated in whole or in part in programmable logic resources.

A conventional microprocessor core embedded in dedicated hardware of an FPGA may include multiple pipelines. These pipelines may be relatively independent from one another. For example, one pipeline may be for executing an instruction and another pipeline may be for accessing data from cache. An auxiliary processor unit ("APU") controller may be coupled to a pipeline of such an embedded microprocessor. An example of an APU controller is described in U.S. Pat. No. 7,243,212 B1, which is incorporated by reference herein in its entirety for all purposes.

Heretofore, an APU controller executed one instruction at a time in order. Thus, an instruction provided to a microprocessor targeted for an auxiliary coprocessor coupled via an APU controller had to be completely executed by both the coprocessor and the APU controller before another instruction for such coprocessor could be passed to the APU controller for execution by the coprocessor. Thus, back-to-back APU instructions provided to a microprocessor meant that the latter of such instructions would be stalled until complete execution of the earlier of such instructions. This stalling of the microprocessor occurred even if the subsequent instruction of such instructions was for processing via a different pipeline of such microprocessor than the earlier of such instructions. Accordingly, back-to-back transactions could not be processed without at least one wait state, namely at least one "dead" microprocessor system clock cycle, between such transactions.

Moreover, heretofore out-of-order execution was not supported. Thus, even if a microprocessor having multiple pipelines supported out-of-order execution, out-of-order execution of instructions provided to an APU controller was not supported, namely would stall the microprocessor.

SUMMARY OF THE INVENTION

One or more aspects of the invention generally relate to a decode mode for an auxiliary processor unit controller for an IC.

An aspect relates generally to a method for decoding, including: obtaining an op-code from a master device; setting a mode to mask a first portion of the bits of the op-code, where the first portion of the bits are for being treated as a wildcard value; and decoding a second portion of the op-code which is not masked to determine whether the op-code is for a slave device. The decoding of the second portion is performed by a controller having a decoder, and the controller bridges the master device for communication with the slave device. The decoding of the first portion of the bits is performed by the slave device. The first portion of the bits identifies an instruction from a group of instructions, and the group of instructions uses a single configuration register of registers of the controller.

Another aspect relates generally to another method for decoding, including: obtaining an op-code from a master device; setting a mode to mask a first portion of the bits of the op-code, where the first portion of the bits are for being treated as a wildcard value; and decoding a second portion of the op-code which is not masked to determine whether the op-code is for a slave device. The decoding of the second portion is performed by a controller having a decoder, and the controller bridges the master device for communication with the slave device. The decoding of the first portion of the bits is performed by the slave device, and the first portion of the bits is a value for the slave device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
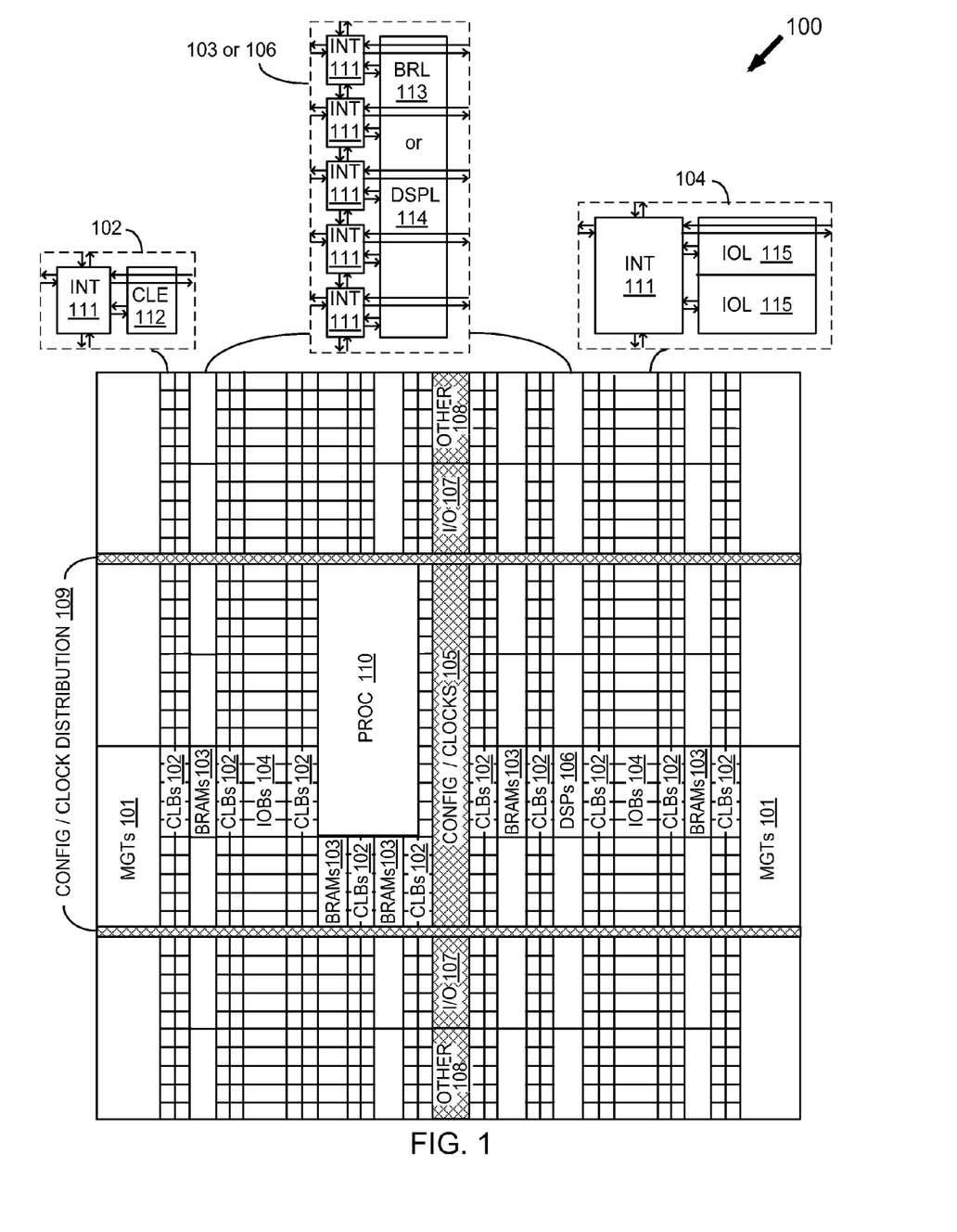
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text or data that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5 FPGA available from Xilinx, Inc. of San Jose, Calif., can be programmed to incorporate pre-developed logic blocks with pre-designed functionalities, i.e., "soft cores". A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream.

Moreover, a hardwired core ("hard core"), such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings.

For purposes of clarity by way of example, it shall be assumed that the embedded processor in an FPGA is used. Such an embedded processor may be a PowerPC 440 core processor. However, it should be appreciated that other types of processors may be used provided such processors have more than one pipeline for processing instructions. Furthermore, it should be appreciated that an APU controller may be used with an embedded microprocessor or a stand alone microprocessor, and with respect to the former, such embedded processor may be embedded in any integrated circuit chip, including an FPGA.

Independently of a pipeline of an embedded microprocessor, instructions may flow through an APU for execution in a device coupled to an APU controller. For purposes of clarity by way of example and not limitation, it shall be assumed that the device coupled to such APU controller is a coprocessor which is at least partially instantiated in programmable logic resources ("fabric") of FPGA 100. Thus, it shall be assumed that instructions are executed by a "fabric coprocessor". Even though the example of a coprocessor is used, it should be understood that any device capable of executing instructions and instantiated in whole or in part in FPGA fabric may be used.

Figure 2:
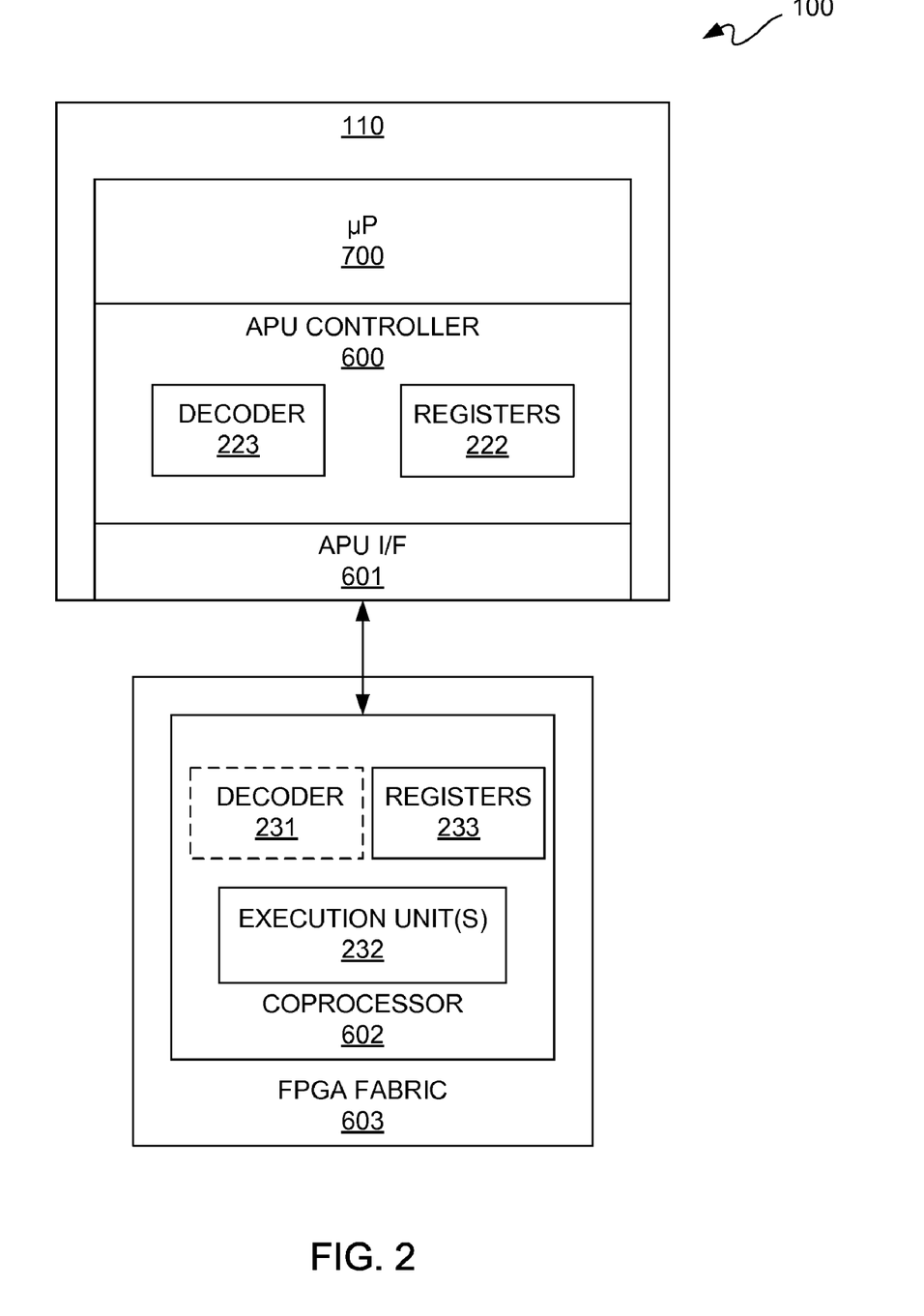
FIG. 2 is a block diagram depicting an exemplary embodiment of an FPGA having a processor block coupled to a coprocessor.

FIG. 2 is a block diagram depicting an exemplary embodiment of an FPGA 100 having processor block 110 coupled to a "soft" coprocessor 602 instantiated in FPGA fabric 603. More particularly, processor block 110 includes microprocessor 700, APU controller 600, and APU interface 601. Microprocessor 700, APU controller 600, and APU interface 601 may all be implemented using hardwired or dedicated circuitry in contrast to programmable logic of FPGA fabric 603 which is used to instantiate coprocessor 602. APU controller 600 may be used for bridging a master device, such as microprocessor 700, with a slave device, such as coprocessor 602.

Figure 3:
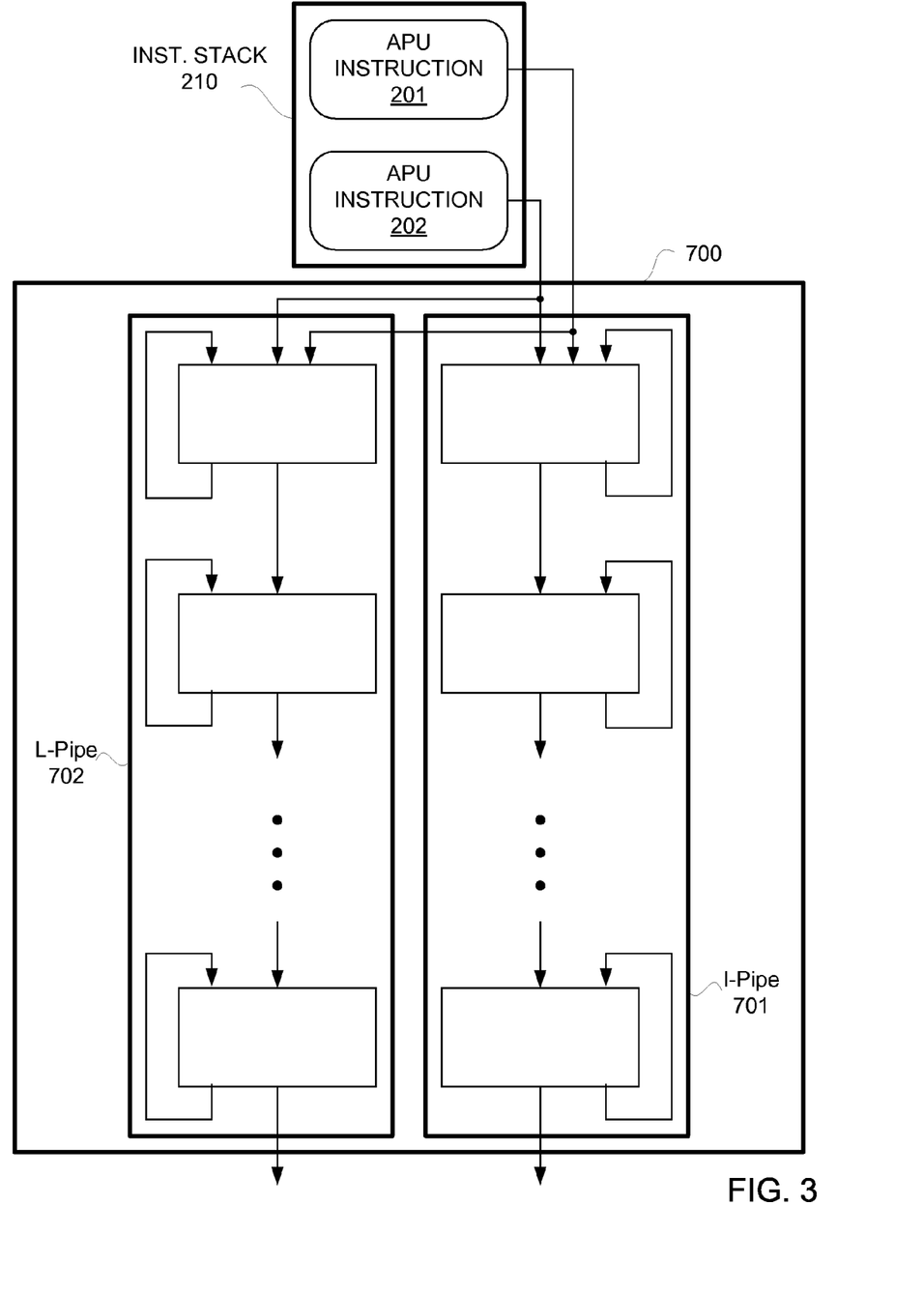
FIG. 3 is a block diagram depicting an exemplary embodiment of microprocessor having pipelines.

FIG. 3 is a block diagram depicting an exemplary embodiment of microprocessor 700 having pipelines 701 and 702. An instruction stack 210 may store one or more instructions which may be provided to pipelines 701 or 702 of microprocessor 700. For example, APU instruction 201 may be provided to pipeline 701 and APU instruction 202 may be provided to pipeline 702. Thus, APU instructions may be parallel piped through microprocessor 700.

In an exemplary embodiment described herein, a PowerPC 440 core is used. The PowerPC 440 core available from IBM is a dual issue out-of-order superscalar microprocessor having seven pipeline stages associated with three execution pipelines. The three execution pipelines are a complex integer pipeline, namely an I-pipe, a simple integer pipeline, namely a J-pipe, and a load/store pipeline, namely an L-pipe. The seven pipeline stages are an instruction fetch stage, a pre-decode stage, a decode and issue stage, a register access stage, an address generation/execution stage, a cache read/execution stage, and writeback stage.

For a PowerPC 440 core, microprocessor 700 determines whether all previous instructions have confirmed before allowing an instruction to commit. An instruction being allowed to commit means such an instruction will be allowed to finish or complete. Instructions within the same pipeline execute in order, but between pipelines instructions may execute out of order. However, all instructions commit in order. Once an instruction is committed, such instruction may be completed in or out of order with respect to another instruction. APU instructions generally will execute in order, but once committed may complete out of order. Generally, an instruction fetch stage precedes a pre-decode stage which precedes a decode and issue stage. Following the decode and issue stage may be a register access stage, followed in sequence by an execute/address generation stage, an execute/cache read stage, and a writeback stage. With reference to FIGS. 2 and 3, the decode and issue stage through the writeback stage may be coupled to APU controller 600.

With respect to the decode and issue stage, which may be mirrored in APU controller 600, such a decode and issue stage may include a decode and issue queue that queues up pre-decoded instructions to allow two instructions per clock cycle to be input to pipelines of a PowerPC 440 core microprocessor. Thus, for example, a decode and issue queue ("DISS0") register bank and a ("DISS1") register bank of microprocessor 700 may have queued instructions for pipelines thereof.

On a microprocessor side of APU controller 600, such APU controller 600 may be coupled to microprocessor 700. Additionally, APU controller 600 may include a decoder 223 and registers 222 for decoding registered user defined instructions ("UDIs"), as well as for decoding other received instructions. On a fabric coprocessor module ("FCM") side of APU controller 600, such APU controller 600 may be coupled to registers 233 of coprocessor 602 as well as to one or more execution units 232 thereof. Additionally, coprocessor 602 may include an optional decoder 231. For a PowerPC, Ra and Rb fields are used to specify operand registers, and an Rt field is used to specify a target register. Some details of the interfacing between microprocessor 700 and APU controller 600, as well as between coprocessor 602 and APU controller 600, are described in the above-referenced U.S. Pat. No. 7,243,212 B1, which is incorporated herein by reference in its entirety.

APU controller 600 may be configured to decode FCM instructions. APU controller 600 may decode such instructions in order to notify microprocessor 700 what resources the instructions are going to use. For example, if an instruction is a load, APU controller 600 may notify microprocessor 700 of the transfer size and any source data to be used for the load. More generally, a PowerPC processor may use both primary and extended op-codes to identify potential instructions for an FCM, namely potential APU instructions.

Load and store instructions for an FCM, such as coprocessor 602, allow data transfer between a memory system associated with microprocessor 700 and coprocessor 602. Microprocessor 700 may handle address calculation and pass data to and from memory for this communication. An FCM may load transferred data from a memory location to a destination register in such FCM, and vice versa for an FCM store operation. In addition to storage instructions, such as loads and stores, an FCM may have non-storage instructions.

Non-storage instructions for an FCM have more flexibility with respect to op-codes and the function of such op-codes than microprocessor storage instructions. If an FCM load/store instruction is flushed from a microprocessor pipeline, APU controller 600 may notify the FCM by sending it a flush signal. APU controller 600 may provide a signal indicating when an FCM load instruction may no longer be flushed and may safely update internal registers 233 of such FCM.

Generally, there are two types of store instructions, namely those using a writeback okay signal and those not using a writeback okay signal. Stores without a writeback okay signal may have better performance. A store instruction ("store") that does not use a writeback okay signal, namely does not wait for a writeback okay signal, does not have any resource in an FCM that is updated based on such a store completing. A store that waits for a writeback okay signal either has at least one resource in an FCM that is updated when the store completes or the FCM may have a different endian address than memory. A different endian address means waiting for an endian signal associated therewith. An FCM may receive a writeback okay signal and in response in the same clock cycle or in a subsequent clock cycle indicate that the store data bus is valid. The term bus as used herein means a group of signals.

There are three categories of non-storage user defined instructions, namely autonomous instructions, non-autonomous early-confirming instructions, and non-autonomous late-confirming instructions. Autonomous instructions do not stall a pipeline of a microprocessor. Such autonomous instructions are "fire-and-forget" instructions that do not return any result data or condition record bits to a microprocessor. APU controller 600 may be configured to automatically confirm to microprocessor 700 that an autonomous instruction will not cause an exception, and an FCM may receive a writeback okay signal when an instruction cannot be flushed from a microprocessor pipeline. An example of an autonomous instruction may be an instruction that reads contents of one or more general purpose registers of a microprocessor without returning any data to the microprocessor.

A non-autonomous instruction may stall normal execution in a microprocessor pipeline until an FCM instruction is completed. Non-autonomous instructions may return result data or status, such as condition record bits, to a microprocessor. APU controller 600 may wait for an FCM to confirm that a non-autonomous instruction will not cause an exception with respect to late confirmation, to allow an FCM, such as coprocessor 602, to issue an exception. A non-autonomous instruction with early confirmation allows APU controller 600 to automatically confirm to microprocessor 700 that such an instruction will not cause an exception.

Non-storage instructions may be used to source data from general purpose registers in microprocessor 700, send result data to general purpose registers in microprocessor 700, update condition record bits in microprocessor 700, or a combination thereof.

Even though only two APU instructions 201 and 202 are illustratively shown in instruction stack 210, it should be appreciated that more than two APU instructions 201 and 202 may be stacked in instruction stack 210. Instructions which are not for coprocessor 602, but which are for execution by microprocessor 700 may be in instruction stack 210, but are not shown here for purposes of clarity and not limitation. APU instructions 201 and 202 are received in order, where APU instruction 201 is received first, and APU instructions 201 and 202 are provided in order to microprocessor 700 and to APU controller 600.

Figure 4:
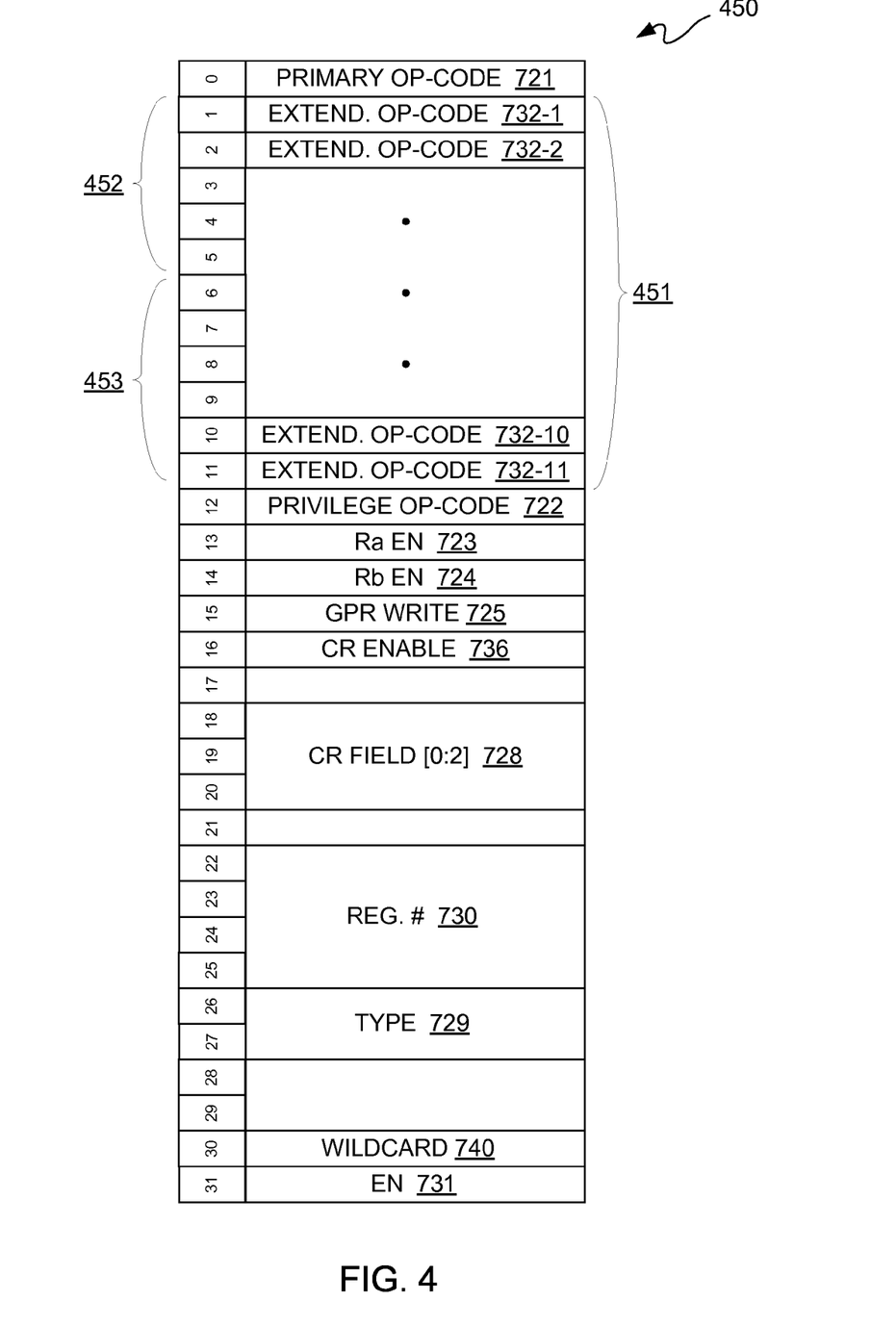
FIG. 4 is a block diagram depicting an exemplary embodiment of bit positions of a User Defined Instruction ("UDI") register.

FIG. 4 is a block diagram depicting an exemplary embodiment of bit positions of a User Defined Instruction ("UDI") register 450. UDI register 450 may be one of registers 222 of FIG. 2.

With simultaneous reference to FIGS. 2 and 4, UDI register 450 is further described. Generally, microprocessor 700, such as a PowerPC, uses both primary and extended op-codes to identify potential FCM instructions. Primary op-code field 721, extended op-code fields 732-1 through 732-11, privilege op-code field 722, Ra enable field 723, Rb enable field 724, general purpose register ("GPR") write field 725, conditional register ("CR") field 728, register number field 730, type field 729, and enable field 731 are as described in the above referenced patent, and accordingly such description is not repeated here for purposes of clarity. However, it should be understood that bit position of any of the above fields may have changed in order to accommodate the modified UDI register 450 as described herein. Moreover, bit positions may be varied from bit positions 0 through 31, illustratively shown in FIG. 4. Newly added fields used to form UDI register 450 include CR enable field 736 and wildcard field 740.

Op-codes are decoded by decoder 223 of APU controller 600 to identify for example an instruction resource of coprocessor 602 to be used. As previously described, generally Ra and Rb fields specify operand registers, and an Rt field specifies a target register. Thus, an FCM instruction may have a primary op-code, Rt information, Ra information, Rb information, and an extended op-code 451. UDIs may be configured to interpret these bit fields differently. For example, bits 1 through 5, namely bits 452, may be masked from APU controller 600, whereas bits 6 through 11, namely bits 453, may be decoded by decoder 223 of APU controller 600. Bits 452 may be masked when wildcard field 740 has its bit set to invoke a wildcard option for extended op-code 451.

Figure 5:
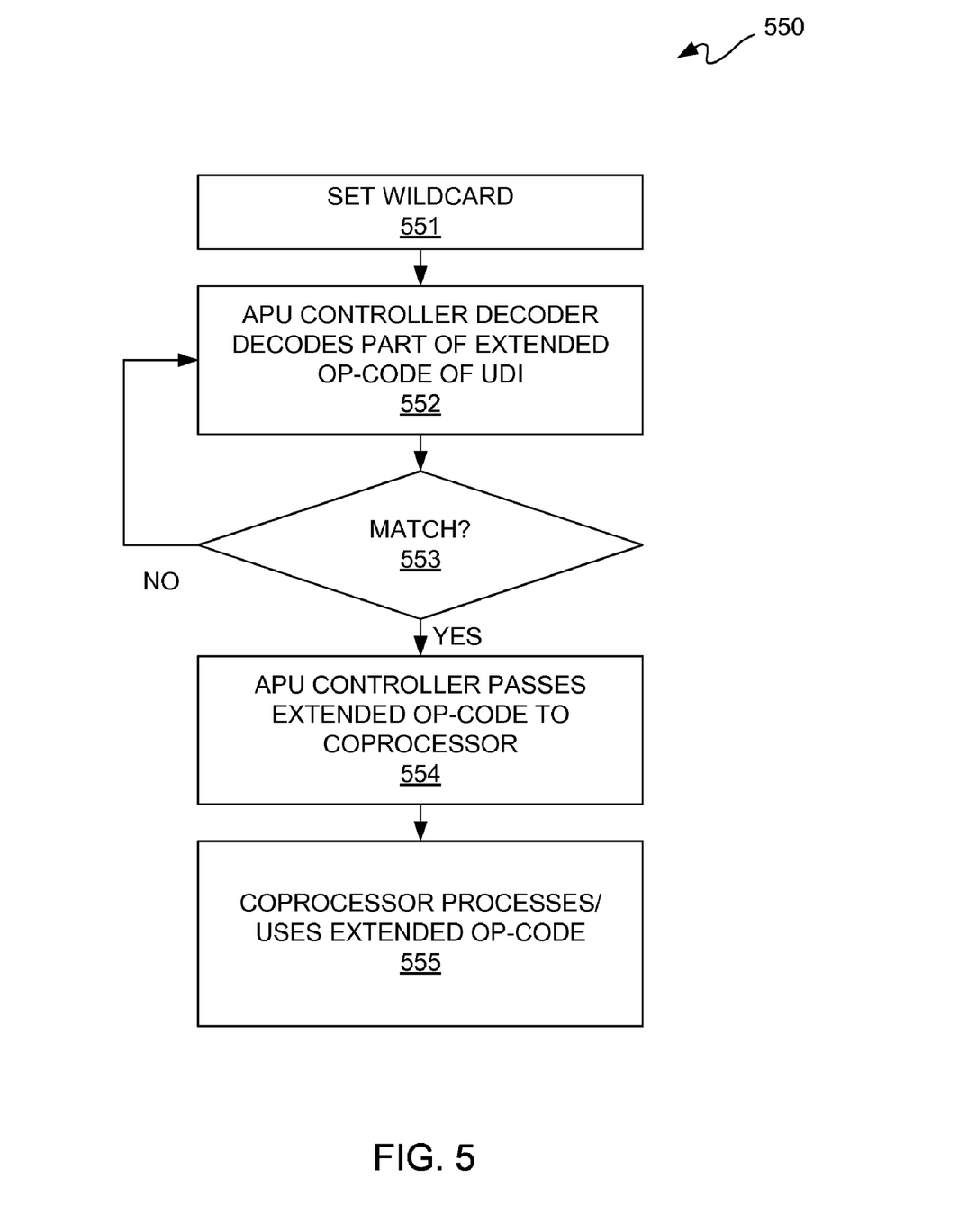
FIG. 5 is a flow diagram depicting an exemplary embodiment of a UDI register setting flow.

FIG. 5 is a flow diagram depicting an exemplary embodiment of a UDI register setting flow 550. FIGS. 2, 4 and 5 are simultaneously referenced for the following description of flow 550.

At 551, a wildcard bit is set such as in field 740. At 552, decoder 223 of APU controller 600 decodes part of extended op-code 451, such as bits 453 of a UDI registered in register 450.

At 553, it is determined whether the decoded part of the extended op-code matches a list of values accessible by APU controller 600 to determine whether or not the op-code is intended for coprocessor 602. If the op-code is not intended for coprocessor 602, namely there is no match, then APU controller 600 may decode a next UDI.

If, however, there is a match at 553, then at 554 the UDI in its entirety, namely both the decoded bits 453 and the masked bits 452, may be passed from APU controller 600 to coprocessor 602. For example, suppose the primary op-code bit 721 is set to a logic 1 and bits 1 through 5 represent a numerical value of four and bits 6 through 11 represent a numerical value of ten. Decoder 223 of APU controller 600 may decode bits 6 through 11 ignoring bits 1 through 5. After decoding by decoder 223, the value of ten decoded may match a stored value in a UDI register accessed by APU controller 600.

APU controller 600 in response to such a match may at 554 pass the entire extended op-code, namely bits 1 through 11, to coprocessor 602. Coprocessor 602 for example may decode with an optional decoder 231 the entire extended op-code, namely bits 1 through 11. Continuing the above example, coprocessor 602 may identify that bits 1 through 5 represent the value four and bits 6 through 11 represent the value ten. The value four may trigger coprocessor 602 to perform some operation, such as some mathematical operation which is associated with the encoded value decoded from the extended op-code 451. For each UDI where bits 452 are masked, namely bits 1 through 5 in this example, the number of possible combinations of values is two to the power of the number of masked bits, which in this example is $2^5$ or 32 possible combinations for bits 452. These combinations, or a subset thereof, may be associated with unmasked encoded bit values.

At 555, coprocessor 602 processes or uses extended op-code 451. In the above example, coprocessor 602 decoded the entire extended op-code 451. However, decoder 231 of coprocessor 602 may be configured to decode only a masked portion, such as bits 452 in the above example, and use the decoded value from decoder 223 of APU controller 600 for bits 6 through 11 to conserve programmable logic resources. In other words, decoder 231 may use less resources if configured to decode only five bits 1 through 5 instead of bits 1 through 11 in the above example.

Furthermore, rather than configuring a group of instructions using only a single UDI register, such as UDI register 450, other uses may be made of masked bits 452 by coprocessor 602. For example, a 5-bit immediate value or data value may be used. In the above example, the data value used by coprocessor 602 would be four. Another use would be to use bits 452 as another register of coprocessor 602 provided, however, that bits 452 are not used as a CPU register value.

In an implementation, there may be approximately 16 UDI registers 450 forming registers 222 available to be set by a user and decoded by decoder 223 of APU controller 600. A user may configure these registers through a DCR controller of a PowerPC.

If a wildcard option is invoked, masked bits 452 may be used to provide a UDI group of instructions using a single UDI register 450, where all instructions in a same UDI group have the same options. In other words, such UDI group may all: be autonomous instructions, use an Ra source operand, be non-autonomous instructions with early confirmation, or have some other option as described elsewhere herein. Instruction types include non-autonomous with early confirmation, non-autonomous with late confirmation, and autonomous, as well as reads and writes. An instruction type may be set by using type field 729. CR enable field 736 is examined when the type is any non-autonomous operation type. Furthermore, each UDI may be configured such than no other UDI shares the same primary op-code and extended op-code bit values.

Resources of microprocessor 700 for a UDI may be defined in UDI registers 222 of APU controller 600, as well as in a configuration register of registers 222. When a UDI is decoded by APU controller 600, an FCM, such as coprocessor 602, may receive some decoded information along with a 32-bit instruction. The decoded signals may include the following information: bit encoded UDI register number, valid bit for such UDI register number, and an instruction type, namely an indication whether the instruction is non-autonomous or autonomous. UDIs that are neither loads nor stores may be specified using UDI registers 222. Even though the example of a slave device coprocessor 602 to master device microprocessor 700 has been used, it should be appreciated that other types of slave devices capable of using UDIs as described herein may be used.

Figure 6:
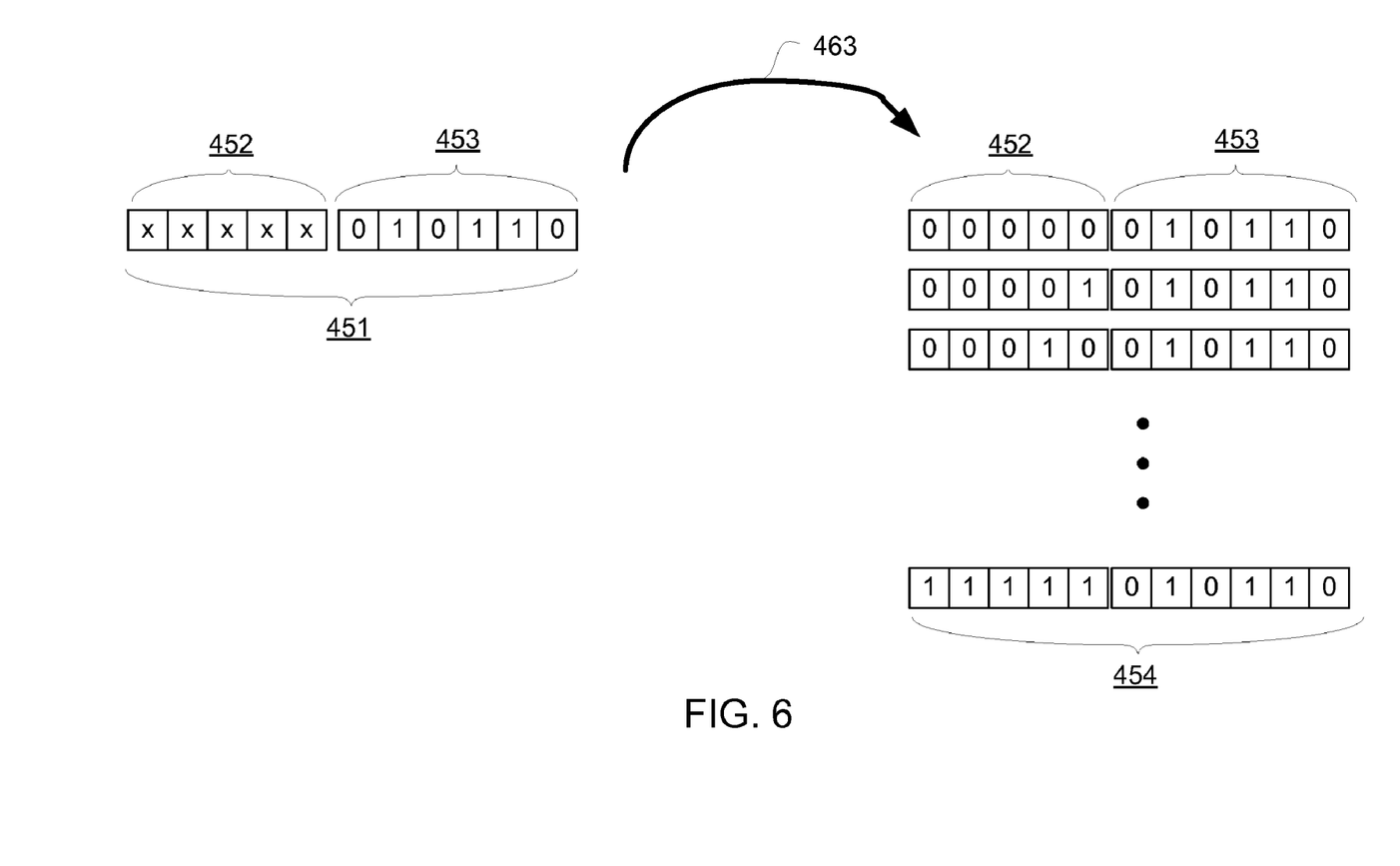
FIG. 6 is a flow diagram depicting an exemplary embodiment of UDI mapping using masked bits.

Accordingly, it should be appreciated that each UDI may represent a group of instructions. In other words, by setting a single UDI register with a UDI value and invoking a wildcard option, such single UDI register setting may represent a plurality of instructions for a coprocessor. For example, FIG. 6 is a block diagram depicting an exemplary embodiment of UDI mapping using masked bits. An example of an extended op-code 451 is 0,1,0,1,1,0 for bits 453 with bits 452 being masked as indicated by an "x." Of course other numbers of bits, whether sequential or not, may be masked. Furthermore, less or more than five bits may be masked, which may vary from application to application. Moreover, a value other than the example binary value for bits 453 may be used.

If extended op-code 451 bits 453 decoded by decoder 223 of APU controller 600 match a registered UDI in registers 222 of APU controller 600, then extended op-code 451 may be passed to decoder 231 of coprocessor 602, as generally indicated by arrow 463. Decoder 231 is not optional in this embodiment. Bits 452 decoded by decoder 231 may be any value from 0,0,0,0,0 to 1,1,1,1,1, as generally indicated as extended op-codes or instructions 454. In other words, extended op-code 451 may be any op-code in a group of op-codes, but only unmasked bits 453 are decoded and checked for a match against one or more registered UDIs of APU controller 600. Thus, with bit masking, the register space for UDIs of APU controller 600 may be significantly smaller than the number of instructions capable of being represented by such UDIs.

Figure 7:
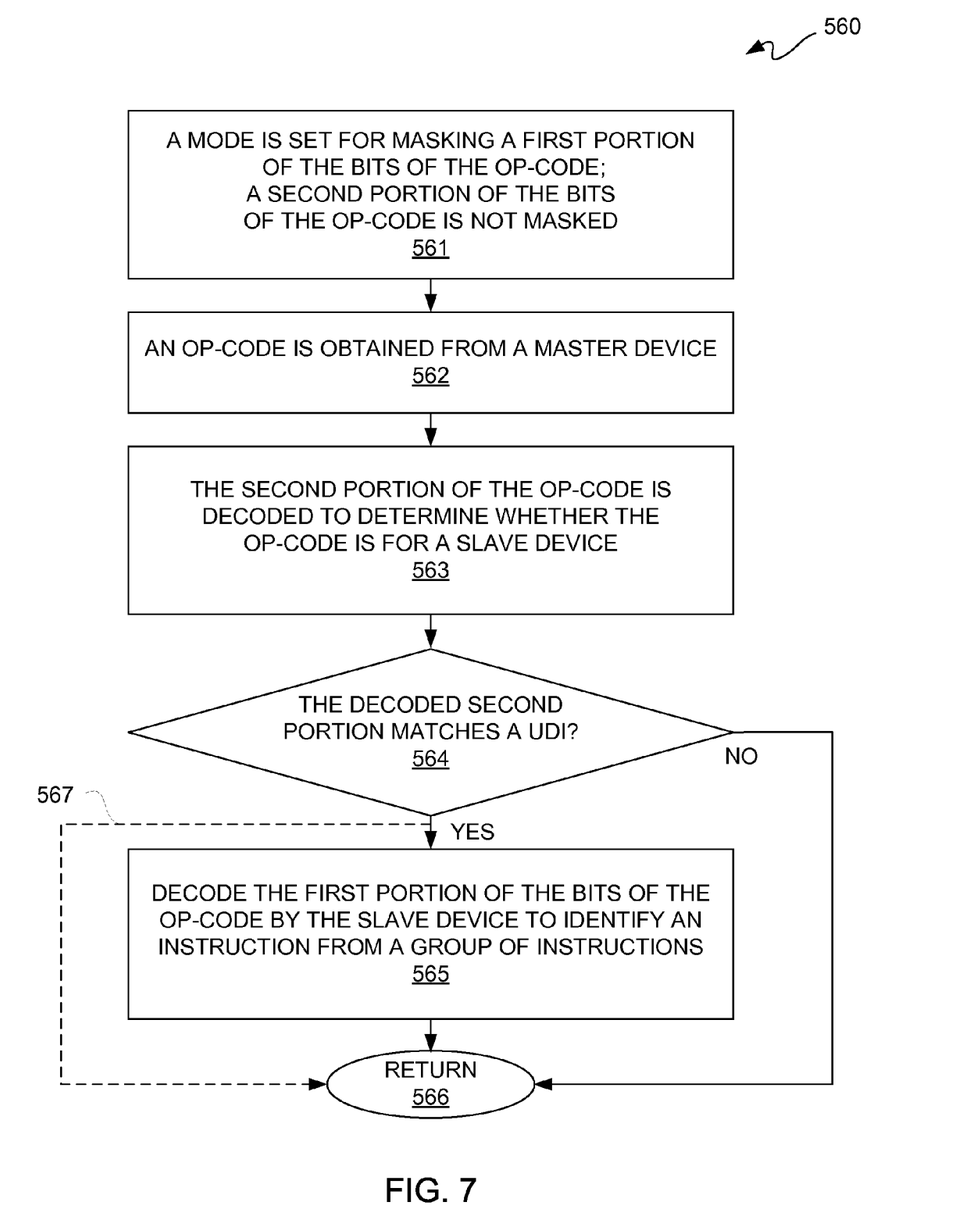
FIG. 7 is a flow diagram depicting an exemplary embodiment of a decoding flow.

FIG. 7 is a flow diagram depicting an exemplary embodiment of a decoding flow 560. At 561, a mode is set for masking a first portion of the bits of an op-code. This setting may take place when one or more UDIs are set by a user. The first portion of the bits, such as bits 452 of FIG. 6, is treated as a wildcard value, namely a value that may be any value in a range of values. The range of values may depend on the number of bits masked. At 562, an op-code is obtained from a master device, such as microprocessor 700. A second portion of the bits, such as bits 453 of FIG. 6, of the op-code is not masked.

At 563, the second portion of the op-code is used to determine whether the op-code is for a slave device. The second portion of the bits is decoded at 563, such as by decoder 223 of APU controller 600, to determine whether the unmasked portion of the op-code is for the slave device.

At 564, the decoded second portion may be compared against one or more stored UDIs in registers 222 to determine if a match exists. If no match exists, then decoding flow 560 may return at 566 for obtaining another op-code, such as at 561. If a match does exist with a registered UDI, then the op-code is for the slave device, such as coprocessor 602. At 565, responsive to a match at 564, the op-code is passed to coprocessor 602 for decoding by decoder 231.

At 565, the first portion of the bits of the op-code is decoded to identify an instruction from a group of instructions. The group of instructions all have the same second portion of bits of the op-code, but have different bits for the first portion of the op-code. Thus, a group of instructions is identifiable from groups of instructions responsive to the first portion of the bits. Accordingly, a single configuration register of registers 222 of APU controller 600 may be used for mapping to a group of instructions, as opposed to a single instruction. After execution of an instruction decoded at 565, at 566 decoding flow 560 may return, such as to obtain another op-code at 561 Optionally, before execution of an instruction at 565, decoding flow 560 may return at 566, such as to obtain another op-code at 561, as generally indicated by dashed line 567.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for decoding, comprising:
obtaining an op-code from a master device;
setting a mode, within a single configuration register defining a group of instructions for a slave device, to mask a first portion of the bits of the op-code when checking for a user defined instruction, wherein each instruction of the group of instructions is a user defined instruction;
the first portion of the bits for being treated as a wildcard value;
decoding a second portion of the op-code which is not masked to determine whether the op-code corresponds to the group of instructions for the slave device by performing a comparison using the single configuration register;
the decoding of the second portion being performed by a controller having a decoder;
the controller bridging the master device for communication with the slave device;
decoding the first portion of the bits by the slave device; and
the first portion of the bits identifying a particular instruction from the group of instructions;
wherein instructions are identifiable as being part of the group of instructions using the single configuration register of a plurality of configuration registers of the controller.

2. The method according to claim 1, wherein the configuration register is a user defined instruction register.

3. The method according to claim 2, wherein the slave device is a coprocessor; and wherein the master device is a microprocessor.

4. The method according to claim 3, wherein the coprocessor is instantiated at least in part in programmable logic; and wherein the microprocessor is a hardwired embedded core.

5. The method according to claim 1, wherein the slave device decodes only the first portion of the bits.

6. The method according to claim 1, wherein the op-code is an extended op-code.

7. The method according to claim 6, wherein the decoding the first portion of the bits by the slave device is performed by a decoder of the slave device.

8. The method according to claim 7, wherein the decoder of the slave device is configured to decode the first portion and the second portion of the op-code.

9. A method for decoding, comprising:
obtaining an op-code from a master device;
setting a mode to mask a first portion of the bits of the op-code, wherein the mode is set within configuration register usable to define an instruction for a slave device, wherein the instruction is a user defined instruction;
the first portion of the bits for being treated as a wildcard value;
decoding a second portion of the op-code which is not masked to determine whether the op-code corresponds to the instruction for the slave device by performing a comparison using the configuration register;
the decoding of the second portion being performed by a controller having a decoder;
the controller bridging the master device for communication with the slave device;
decoding the first portion of the bits of the op-code by the slave device to determine which instruction of the group of instructions the op-code corresponds; and
the first portion of the bits being a value for the slave device used during execution of the instruction.

10. The method according to claim 9, wherein the value for the slave device is a data value.

11. The method according to claim 9, wherein the value for the slave device is a register value for the slave device, wherein the first portion of the bits being used as a register of the slave device are within the configuration register of the controller which is external to the slave device.

12. The method according to claim 11, wherein the configuration register is a user defined instruction register.

13. An integrated circuit comprising:
a microprocessor;
an auxiliary processor unit (APU) coupled to the microprocessor, wherein the APU comprises a configuration register defining a group of instructions, wherein the configuration register selectively sets a mode that, when set, masks a first portion of an op-code obtained from the microprocessor when checking for a user defined instruction and decodes a second portion of the op-code that is not masked by performing a comparison using the configuration register; and
a slave device coupled to the APU, wherein the slave device receives at least the first portion of the op-code from the APU according to decoding of the second portion by the APU,
wherein each instruction of the group of instructions is a user defined instruction and is for the slave device.

14. The integrated circuit of claim 13, wherein the integrated circuit is a programmable integrated circuit, wherein the microprocessor and the APU are hard circuits, and wherein the slave device is implemented using programmable circuitry of the programmable integrated circuit.

15. The integrated circuit of claim 13, wherein the configuration register is a user defined instruction register.

16. The integrated circuit of claim 13, wherein the configuration register is a single user defined instruction register that defines each instruction of the group of instructions for the slave device.

17. The integrated circuit of claim 13, wherein the APU further comprises a decoder configured to ignore the first portion of the op-code that is masked when the mode is set and decode the second portion of the op-code.

18. The integrated circuit of claim 13, wherein the APU further comprises an APU interface configured to send at least the first portion of the op-code to the slave device responsive to the second portion of the op-code matching a plurality of bits of the configuration register.

19. The integrated circuit of claim 18, wherein the slave device comprises a decoder configured to decode the first portion of the op-code.

20. The integrated circuit of claim 19, wherein the slave device identifies a particular instruction from the group of instructions according to decoding of the first portion of the op-code.

* * * * *

UNITED STATES PATENT AND TRADEMARK OFFICE
CERTIFICATE OF CORRECTION

PATENT NO.        : 7,865,698 B1
APPLICATION NO.   : 12/057356
DATED             : January 4, 2011
INVENTOR(S)       : Kathryn S. Purcell et al.

Page 1 of 1

It is certified that error appears in the above-identified patent and that said Letters Patent is hereby corrected as shown below:

On the Title page of the patent, item (73) Assignee "Xilinix, Inc., San Jose, CA (US)" should read --Xilinx, Inc., San Jose, CA (US)--

Signed and Sealed this
Thirteenth Day of August, 2013

Teresa Stanek Rea
*Acting Director of the United States Patent and Trademark Office*